United States Patent [19]

Inoue

[11] Patent Number: 4,475,996
[45] Date of Patent: Oct. 9, 1984

[54] MULTI-STRAND WIRE ELECTROEROSION MACHINING METHOD AND APPARATUS

[75] Inventor: Kiyoshi Inoue, Tokyo, Japan

[73] Assignee: Inoue-Japax Research Incorporated, Yokohama, Japan

[21] Appl. No.: 354,440

[22] Filed: Mar. 3, 1982

[51] Int. Cl.³ .............................. B23P 1/08; B23P 1/02
[52] U.S. Cl. ............................. 204/129.46; 204/129.1; 204/224 M; 219/69 E; 219/69 W
[58] Field of Search ................... 204/129.1, 197, 206, 204/224 R, 224 M, 208, 225, 129.46; 219/69 W

[56] References Cited

U.S. PATENT DOCUMENTS 3,946,189 3/1976 Pomella et al. .................. 219/69 W
4,103,137 7/1978 Levitt et al. ..................... 219/69 W

FOREIGN PATENT DOCUMENTS 56-126533 10/1981 Japan .
57-87528  6/1982 Japan .
56126535 10/1983 Japan .
2075894 10/1981 United Kingdom ............ 219/69 W Primary Examiner—T. Tung
Assistant Examiner—Nathan Thane
Attorney, Agent, or Firm—Karl F. Ross; Herbert Dubno

[57] ABSTRACT

A multi-strand wire electroerosion machining method and apparatus are disclosed wherein a plurality of wires dispensed from respective wire sources are fed separately into a wire travel path and are assembled via wire guides into a bundle thereof. The bundle of the wires traversing a fluid-flushed cutting zone defined between machining electrode guides constitutes a single traveling electrode for electroerosively machining a workpiece. The wires from the cutting zone are taken up into a collection site while they are held sufficiently taut between the electrode guides. The workpiece is displaced relative to the bundle of traveling wires transversely to the axis thereof to machine a desired contour in the workpiece. Preferably, the wires in the bundle are twisted. Also disclosed is a rotary die for shaping the wires in their travel path to provide the bundle with a predetermined cross-sectional contour spaced from the wall of the workpiece across the machining gap.

25 Claims, 13 Drawing Figures

MULTI-STRAND WIRE ELECTROEROSION MACHINING METHOD AND APPARATUS

CROSS REFERENCE TO RELATED APPLICATION

This application is related to the copending application Ser. No. 240,246 of Mar. 3, 1981 (now U.S. Pat. No. 4,418,263) and, to the extent that it includes subject matter disclosed in said application, is a continuation in part thereof.

FIELD OF THE INVENTION

The present invention relates to an improved traveling-wire electroerosive machining method and apparatus.

The term "electroerosive machining" or "electroerosion" is used herein to refer to a process of electrical machining in general, including electrical discharge machining (EDM) in which a workpiece material is removed by the action of successive electrical discharges, electrochemical machining (ECM) in which a workpiece is machined by electrolytic solubilization of the material and electrochemical-discharge machining (ECDM) in which material removal is effected by a combination of the actions of electrical discharges and electrolytic metal solubilization.

BACKGROUND OF THE INVENTION

In a traveling-wire electroerosion process, a continuous electrode wire is axially transported by a wire axial drive means from a supply means to a takeup means. In the path of wire travel, a pair of machining guide members are disposed at opposite sides of an electrically conductive workpiece to define a straight line path therebetween through which the electrode wire axially is passed while traversing the workpiece, thus positioning the electrode wire in a precise machining relationship with the workpiece. Tension means is provided to hold taut the traveling electrode wire across the supply and takeup sides and between the positioning guide means. An electrical machining current, typically or preferably in the form of a succession of time-spaced electrical pulses, is applied between the traveling electrode wire and the workpiece across a machining gap flooded with a machining liquid, e.g. a water liquid of a dielectric nature or low conductivity, or an aqueous solution or electrolyte, to electroerosively remove material from the workpiece. As the material removal proceeds, the workpiece is displaced transversely to the longitudinal axis or the straight line path of the traveling wire electrode along a prescribed two-dimensional machining feed path under the command, advantageously, of a numerical controller, so that a desired contour of machining is generated in the workpiece.

It is important that the wire electrode be of good electrical conductivity and composed so as to afford a satisfactory rate of material removal and yet be subject to less electroerosive wear itself. It is desirable that the wire electrode be heat-resistant and retain sufficient tensile strength at a temperature created by the passage of a machining current of high amperage or current density, to be free from breakage in operation. Customarily, the wire electrode is constituted as a single strand wire having a diameter of 0.05 to 0.5 mm composed of a copper metal or alloy such as brass. Such a wire has been provided by drawing it through a die and usually has had a circular cross section.

The machining liquid is supplied, typically from one or more nozzles, into the machining gap to serve on the one hand as a gap machining medium to carry the discharge and/or electrolytic current and on the other hand as a coolant to dissipate heat developed by the passage of the machining current of high amperage or current density required. Higher amperage or current density is desirable to achieve greater removal rate and efficiency, and necessitates removal of the machining liquid from the gap at a higher rate.

It has, however, been experienced that the continued supply of the machining liquid in an ample amount towards the machining gap often causes wire breakage and does not allow the use of a greater machining current. When the electrode wire is excessively heated or insufficiently cooled, it tends to break. There is thus a severe limitation in the heat-dissipation ability of a conventional electrode wire traversing the machining gap. With a conventional electrode wire having a regular machining surface, it has also been observed that gases produced by discharges and/or electrolytic decomposition of the delivered machining liquid tend to be adherent to the electrode surface to separate the latter from the coolant liquid and thus to act as a thermal insulator therebetween, and further to allow gaseous discharges essentially of a thermal nature to develop thereacross. Furthermore, a number of electrode wires of different thicknesses have had to be replaced by one after another depending upon particular configurations to be machined in a workpiece.

OBJECTS OF THE INVENTION

It is, accordingly, a important object of the present invention to provide a traveling-wire electroerosion machining method and apparatus which facilitate delivery of the machining liquid onto the electrode surface and cooling of the latter, make it unnecessary to replace electrode wires to machine diverse machining configurations and allow the electrode to resist breakage.

Another important object of the present invention is to provide an electroerosion machining method and apparatus of traveling-wire type which allow a machining current of greater amperage to be delivered through the machining gap, thereby affording greater machining efficiency than the prior art.

Other and specific objects of the invention will become apparent as the description thereof which follows proceeds.

SUMMARY OF THE INVENTION

In accordance with the present invention there is provided, in a first aspect thereof, an improved method of electroerosively machining an electrically conductive workpiece with a traveling elongate electrode in a cutting zone defined between a pair of machining electrode guides and flushed with a machining fluid, which method comprises the steps of: (a) continuously dispensing a plurality of electrically conductive wires from respective wire sources in a wire supply site to feed the wires separately into a wire travel path towards the cutting zone; (b) guiding the separate traveling wires in the path to bring them together into an essentially mutual parallel contact at least between the machining electrode guides and thereby forming a bundle thereof traversing the cutting zone and constituting the traveling elongate electrode; (c) passing an electroerosion machining current between the bundle of the traveling wires and the workpiece to electroerosively remove material from the workpiece in the fluid-flushed cutting zone; (d) continuously taking up the wires from the cutting zone into a collection site while holding the traveling wires taut between the machining electrode guides; (e) displacing the workpiece relative to said wire bundle transversely to a longitudinal axis thereof to machine a contour in the workpiece.

The wire bundle provides in step (c) an electroerosive machining surface collectively formed by the individual wires, which acts against the workpiece. Specifically, the individual wires may be of a regular circular cross-section and may be of a diameter or thickness ranging between 0.05 and 0.5 mm and preferably between 0.1 and 0.5 mm. All such wires may be of an equal thickness or diameter. Alternatively one or more of the wires may be of a thickness or diameter greater than that or those of the remainder. The number and size or sizes of the wires used may be selected depending upon a particular cross-sectional shape of the surface contour of the bundle which is collectively defined by the individual wires as well as upon a particular cross-sectional area of the wire bundle desired. The number of wires for assembling should typically be 2 to 5. Advantageously, the wires may in step (b) be shaped to provide the wire bundle with a preselected surface contour.

The invention also provides, in a second aspect thereof, an apparatus for electroerosively machining an electrically conductive workpiece with a traveling elongate electrode in a cutting zone flushed with a machining fluid, which apparatus comprises: a pair of machining electrodes guides for defining the cutting zone therebetween; a plurality of wire sources in a wire supply site for dispensing wires respectively therefrom to feed them separately into a wire travel path towards the cutting zone; wire guide means for assembling the separate traveling wires in the path to bring them together into essentially mutual parallel contacting relationship at least between the machining electrode guides whereby to form a bundle thereof traversing the cutting zone and constituting the traveling elongate electrode; a power supply for passing an electroerosion machining current between the bundle of traveling wires and the workpiece to electroerosively remove material from the workpiece in the fluid-flushed cutting zone; wire drive means for continuously taking up the wires from the cutting zone into a collection site; tension means for holding the traveling wires taut between the machining electrode guides; and machining feed means for displacing the workpiece relative to the wire bundle transversely to a longitudinal axis thereof to machine a contour in the workpiece.

BRIEF DESCRIPTION OF THE DRAWING

These and other features of the present invention and advantages thereof will become more readily apparent from the following description made with reference to the accompanying drawing in which.

SPECIFIC DESCRIPTION

Figure 1:
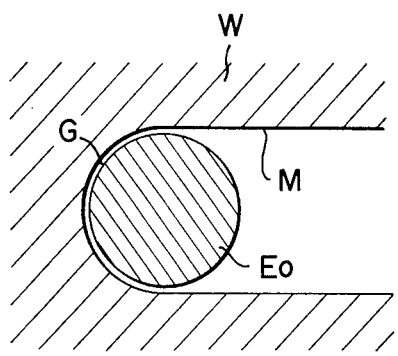
FIG. 1 is a diagrammatic cross-sectional view, largely magnified, of a conventional, single-strand wire electrode electroerosively cutting a workpiece.

In FIG. 1, a conventional, single-strand wire electrode Eo is shown in a process of electroerosively cutting a workpiece W and machining a contour M therein. The workpiece W may be assumed to be stationary, the wire electrode Eo, while axially traveling, then moving from the right-hand side to the left-hand side as viewed in the FIGURE to continue material removal from the workpiece W across a narrow gap G uniformly maintained in front of the wire electrode Eo. The machining fluid must be consecutively delivered into the gap G and gases as well as other machining products must be consecutively discharged therefrom in order for the gap to be held in an ideal condition. The gap G being of limited space, however, and these flushing activities, as noted previously, tend to be unsatisfactory so that the wire Eo becomes excessively heated, limiting the current which can be passed therethrough to reduce the risk of its breakage.

Figure 2:
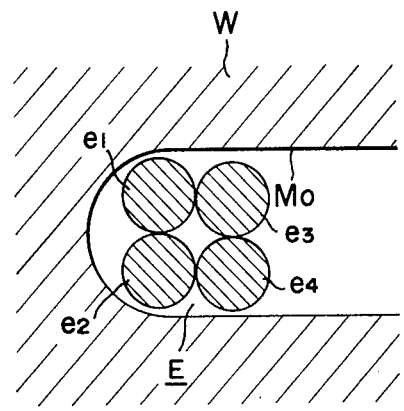
FIG. 2 is a similar view illustrating a bundle of four similar wires electroerosively cutting a workpiece in an arrangement embodying the principles of the present invention.

As shown in FIG. 2, a plurality of thinner wires, shown by four, e1, e2, e3 and e4, may, in accordance with the invention, be assembled together to form a bundle thereof E which has a cross-sectional area defined by the sum of those of the individual wires equal to that of the single-strand wire Eo shown in FIG. 1. It will be seen that the bundle E provides greater resistance to breakage because the tensile strength of the sum of individual wires e1, e2, e3 and e4 is greater in tensile strength than the single-strand wire Eo which is equal in cross-sectional area to the sum of the individual wires of the bundle E. Moreover, the cooling rate is markedly increased because for a given length the surface area of the bundle E is greater than that of the single-strand wire Eo given the same cross-sectional area. In addition, the rugged periphery of the bundle E, which comprises grooves and ridges, offers greater space for fluid flow and hence assures thorough delivery of the machining fluid and facilitates removal of the gap products. These improved flusing actions area especially enhanced when the wire bundle E is twisted or driven, as will be described hereinafter, to reciprocate angularly or rotationally about its axis. In that case, the machined contour M being developed in the workpiece W is, further advantageously, made to conform to the semi-cylindrical machining surface effectively created by the wires e1–e4 which axially move while turning about the axis of the bundle E. In other words, an effective increase in the gap spacing G is provided without effectively changing the machining electrode surface. The increased cooling action permits greater erosion current to be passed and hence results in enhancement in the rate of material removal.

Figure 3:
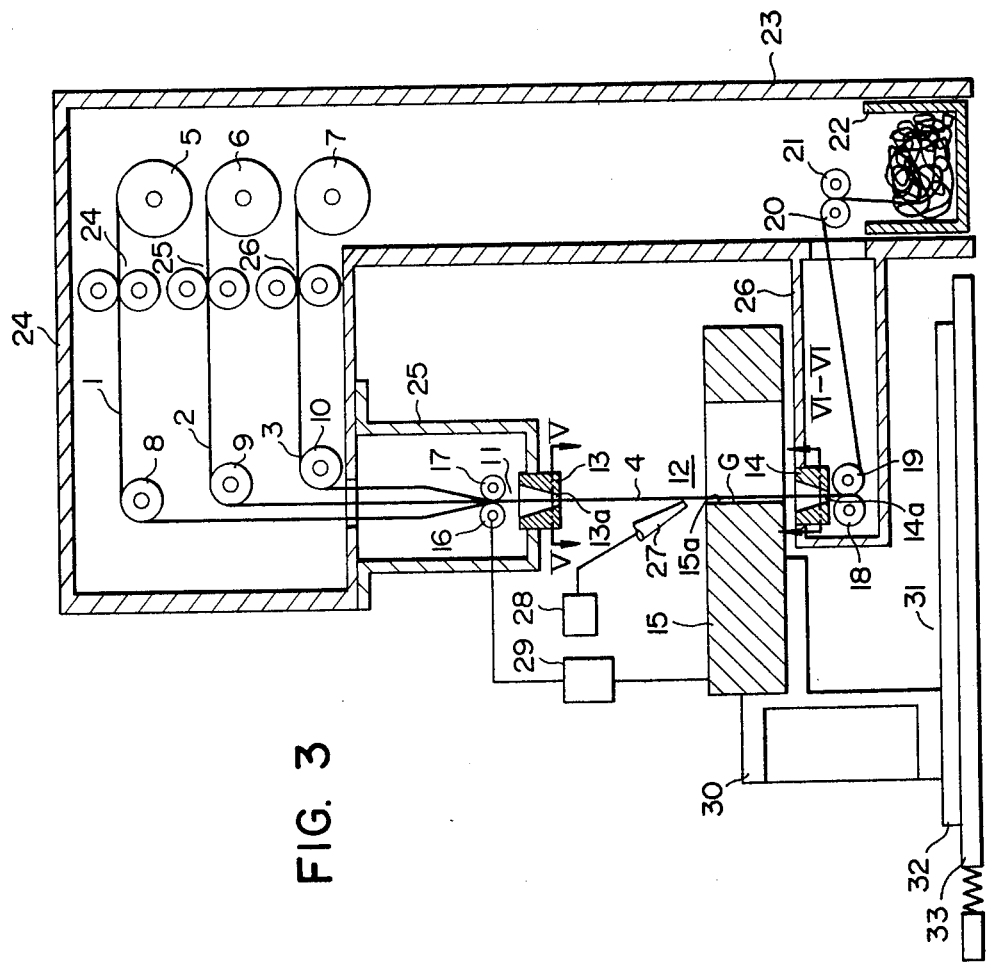
FIG. 3 is a side-elevational view, essentially in cross section diagrammatically illustrating an apparatus according to the invention utilizing fixed electrode guide members.

FIG. 3 shows a traveling-wire electroerosion machining arrangement embodying the present invention. In the arrangement shown, three wires, 1, 2 and 3 are dispensed from respective spools 5, 6 and 7 and fed separately via respective guide rollers 8, 9 and 10 into a wire travel path 11 towards a cutting zone 12 defined between a pair of machining electrode guides 13 and 14 and having a workpiece 15 therein. In the path of wire travel 11, wire assembling guide rollers 16 and 17 are provided to bring the separate wires 1, 2 and 3 together into an essentially parallel-contacting relationship to form a bundle 4 thereof which traverses the cutting zone 12 between the machining electrode guides 13 and 14.

In the wire travel path 11 there are provided, immediately beneath the lower machining electrode guide 14, a pair of wire guide rollers 18 and 19 and, downstream thereof, a further pair of wire guide rollers 20 and 21 to take up the wire bundle 4 into a collection site. The rollers 18 and 21 are constituted by pinch rollers pressing the wire bundle 4 against the rollers 19 and 20 which are constituted by capstans that apply a forward traction drive to the wires 1, 2 and 3 stretched between the supply reels 5, 6, 7; and rollers 20, 21. The wire bundle 4 issuing out between the rollers 20 and 21 is shown as collected into a receptacle 22 accommodated in a column 23 of the machine. A braking traction drive is applied to the wires 1, 2 and 3 by each of the capstan and pinch roller units 24, 25 and 26 arranged between the supply reel and the guide roller, 5 and 8, 6 and 9, 7 and 10 respectively to hold the wire bundle 4 sufficiently taut between the machining electrode guides 13 and 14. Accordingly, the individual separate wires 1, 2 and 3 and hence the bundle 4 thereof are advanced to travel axially at a given rate by the traction drives 18, 19; 20, 21 against the breaking force produced by the units 24, 25 and 26.

The reels 5, 6 and 7 are shown as mounted at an upper portion of the column 23 of the machine and the braking units 24, 25 and 26 and the guide rollers 8, 9 and 10 are shown as mounted on a machine head 24 extending horizontally from the upper portion of the column 23. A housing 25 is attached to the head 24 as depending therefrom and includes the wire-assembling guide rollers 16 and 17. The upper machining electrode guide 13 is provided at a lower end of the housing 25 whereas the lower machining electrode guide 14 is provided on an arm 26 extending horizontally from the lower portion of the column 23. A nozzle 27 is disposed above the workpiece 15 and fed with the machining fluid, e.g. a distilled water medium, from a reservoir 28 to direct it onto the bundle 4 of wires 1, 2 and 3 entering into the cutting zone 12 in the workpiece 15. A machining power supply 29 has one output terminal electrically connected to the workpiece 15 and the other output terminal electrically connected to the electrically conductive guide roller 16 which constitutes one of the wire-assembling guide rollers 16, 17. An electrical machining current is thus passed from the power supply 29 between the bundle 4 of wires 1, 2 and 3 and the workpiece 15 through the machining fluid to electoerosively remove material from the workpiece 15 across the machining gap G.

While the wires 1, 2 and 3 are shown to be taken up altogether or in the bundle into the collection site, they may after traversing the lower machining guide 14 be separated from one another and separately taken up into respective collectors, e.g. reels. It should be noted that all wires need not be advanced in the one direction. Thus one or two of them may be advanced from up to down as shown while the other may be advanced from down to up through the cutting zone 12. Then the bundle 4 is formed by wires traveling in opposite directions in the cutting zone 12 between the machining electrode guides 13 and 14.

The workpiece 15 is supported on a workstand which is, in turn, mounted on a worktable 31 comprising an X-axis component table 32 and a Y-axis component table 33 arranged in a cross-feed configuration. The tables 32 and 33 are driven by respective motors controlled with command signals from a NC (numerical control) unit to displace the workpiece 15 in a plane transverse to the axis of the bundle 4 of wires, 1, 2 and 3 along a prescribed cutting path which defines the contour of cut to be electroerosively machined in the workpiece 15.

Figure 5:
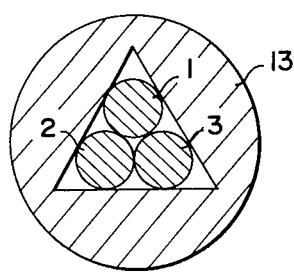
FIGS. 5 and 6 are cross-sectional view of the upper, and lower machining electrode guides which may be used in the arrangements of FIGS. 3 and 4, and taken along V—V and VI—VI, respectively, in FIG. 3.
Figure 6:
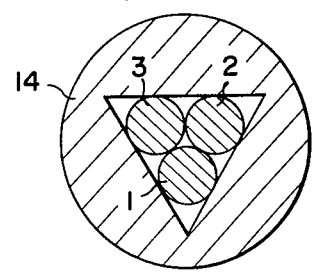

Each of the machining electrode guides 13 and 14 are shown as formed with a guide opening 13a, 14a, which may be triangular in cross section, for slidably guiding wires 1, 2 and 3 in the bundle 4 therethrough. Preferably, the guides 13 and 14 are arranged, as shown in FIGS. 5 and 6, to twist the wires 1, 2 and 3 therebetween. This arrangement causes the wires 1, 2 and 3 to be axially displaced while turning about the axis of the bundle 4 in the cutting zone 12 to develop, juxtaposed with the workpiece wall 15a being machined, the a moving electrode surface effectively semi-cylindrical in cross section and to allow the wall 15a to conform to the semi-cylindrical electrode surface.

Figure 4:
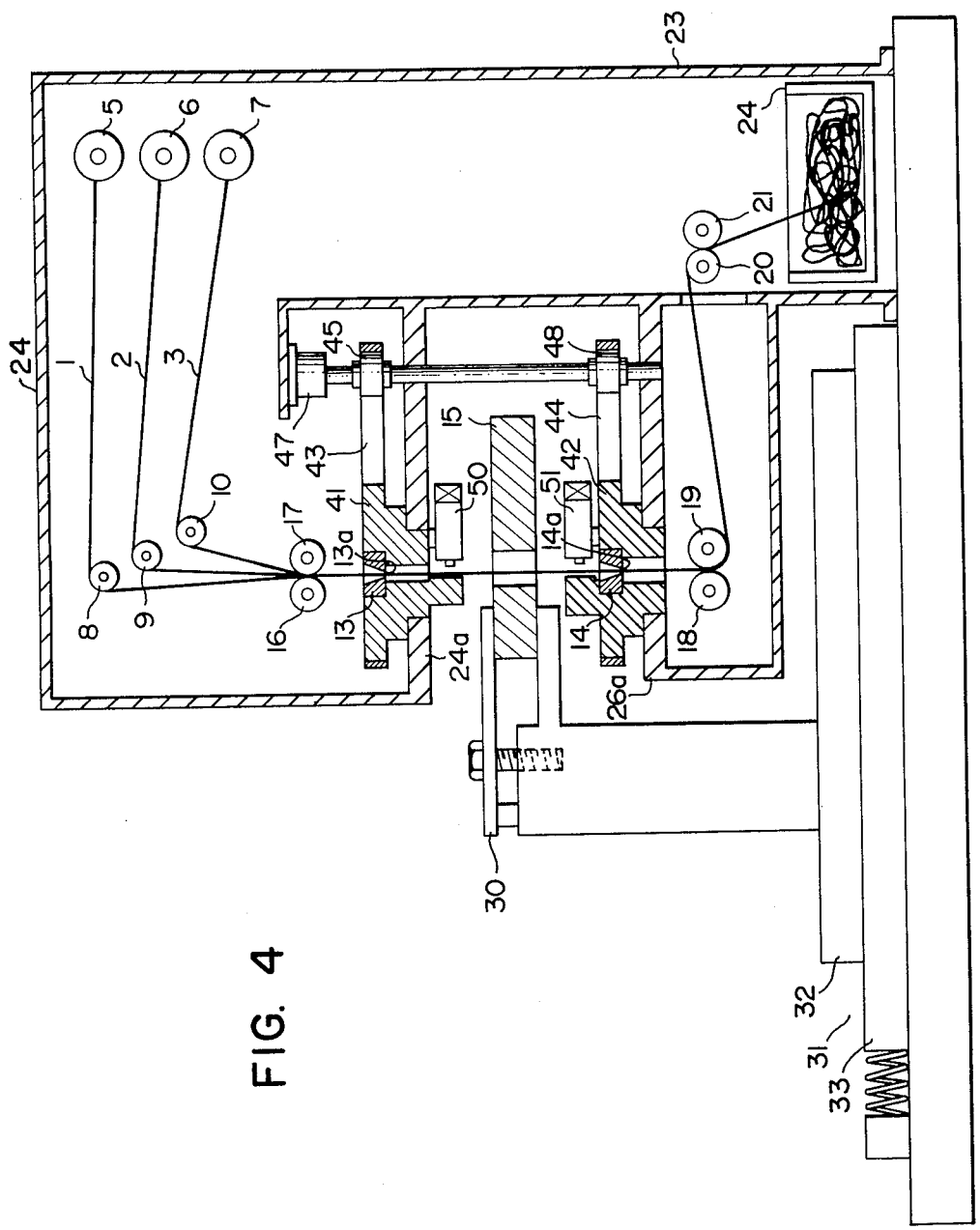
FIG. 4 is a similar view diagrammatically illustrating another apparatus of the invention utilizing rotary electrode guide members.

In the embodiment of FIG. 4 in which the same reference numerals are used to designate the same parts as in FIG. 3, the machining guides 13 and 14 are rotational. In this embodiment, thus, the guide blocks 13 and 14 are securely received in pulleys 41 and 42 which are rotationally supported through the lower plate 24a of the machine head 24 and through the upper plate 26a of the arm 26, respectively. Each of the pulleys 41 and 42 is connected via an endless belt 43, 44 with a pulley 45, 46 rotationally driven by a servo motor 47, 48. It is apparent that the pulleys and endless belts may be replaced by gears and gear transmissions. A reciprocation signal may energize the motors 47 and 48 to rotationally reciprocate the electrode guides 13 and 14 synchronously but always out of phase or in opposite directions to continuously or periodically twist the wires 1, 2 and 3 in the bundle 4 in the cutting zone 12. The electrode surface is in effect a semi-cylinder and is thus here again provided by the axially moving bundle 4 or wires 1, 2 and 3 in the cutting zone 12.

Figure 7A:
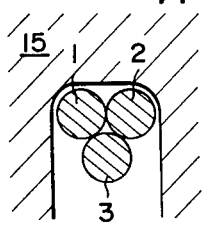
FIGS. 7A–7F are cross sectional views of wires in bundle arranged therein in various formats for electroerosively cutting a workpiece.
Figure 7B:
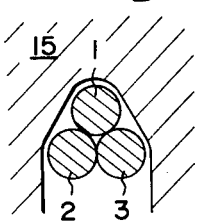
Figure 7C:
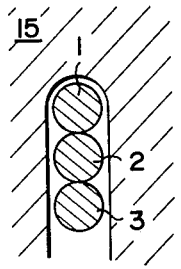
Figure 7D:
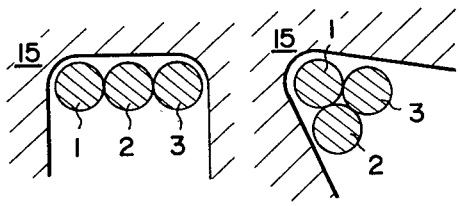
Figure 7E:
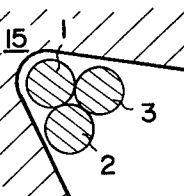
Figure 7F:
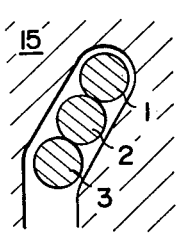
Figure 8:
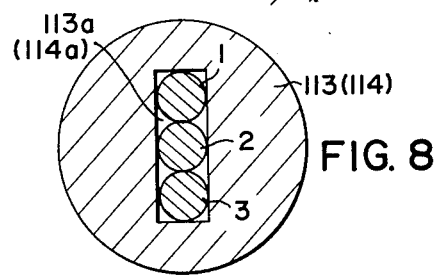
FIG. 8 is a cross-sectional view of another embodiment of machining electrode guide for use with the invention.

A pair of movable electromagnetic solenoid units 50 and 51 diagrammatically shown disposed in the path of wire travel between the machining guides 13 and 14 may be employed and may operate to regulate the cross-sectional arrangement of wires 1, 2 and 3 in the bundle 4 in the cutting zone 12 and hence the arrangement of wires 1, 2 and 3 relative to the direction of cut in the workpiece 15 in any desired format such as shown in FIG. 7(A)–(F) in the course of a given intricate contour-machining operation. In this manner, the cross section of the wire bundle is shaped readily in any desired format according to the particular configuration and geometry which are to variably appear in a given machining contour. Obviously, the solenoid units are operable with a ferromagnetic wire and may be replaced by mechanical die sets designed to be displaced by a numerical controller to alter the shape of the die openings. To this end, it will be apparent that the basic structure of the rotary die sets 13 and 14 may be employed with three wires 1, 2 and 3 as shown to be assembled. The die opening 13, 14 should be triangular in cross section and sized to slidably accept the wires as shown in FIGS. 5 or 6. The servo motors 47 and 48 operate to variably establish an angular position of the guide openings 13a and 14a so that the wires 1, 2 and 3 are arranged in any one or another of the formats as shown in FIGS. 7A, 7B and 7C. To enable the wires 1, 2 and 3 to align in a row as shown in FIG. 7C, 7D or 7F, a pair of further rotary die sets 113, 114 similar to die sets 13, 14 may be provided each having a rectangular die opening 113a, 114a for accepting the wires 1-3 in row as shown in FIG. 8 and the triangular die sets 13 and 14 may be disassembled and retracted. A desired angle of orientation of the row of the wires can then be established by the corresponding angular positioning of the dies 113, 114 through motors.

There is thus provided, in accordance with the invention, an improved electroerosive machining method as well as apparatus therefor which facilitates delivery of the machining fluid onto the electrode surface and cooling thereof, hence permitting a machining current of greater amperage to be delivered through the electrode whereby to afford enhanced cutting efficency. The unique traveling elongate electrode constituted by a bundle of wires is, further advantageously, greater in breaking strength for a given electrode cross section. In practice, the number in relation to the thickness of strand or component wires may simply be selected to establish a desired electrode thickness and cross section. Still further advantageously, the invention offers the shaping of the electrode in the cutting zone to effectively alter its machining surface area so that cutting at each portion of the machining contour can be achieved with both a maximum precision and efficiency.

What is claimed is:

1. A method of electroerosively machining an electrically conductive workpiece with a single elongate tool electrode in a cutting zone located between a pair of electrode guides and flushed with a machining fluid, the method comprising the steps of:
   (a) dispensing a plurality of continuous, electrically conductive, elementary electrode wires from respective wire supply sources continuously to feed the multiple wires separately into a single, straight-line, wire-travel path defined between said electrode guides;
   (b) assembling said separate, continuously traveling multiple elementary electrode wires in said path to bring them together into a substantially mutually abutting relationship along a length thereof across said cutting zone to form a unitary bundle of said multiple elementary electrode wires traversing said workpiece, said unitary bundle constituting said single elongate tool electrode;
   (c) electrically connecting said traveling multiple wires to one pole of an electroerosion power supply and said workpiece to the other pole thereof to pass a machining current between said unitary bundle and said workpiece across a machining gap, thereby to erosively remove material from the workpiece in said fluid-flushed cutting zone;
   (d) taking up said wires from said cutting zone for collection while holding the traveling multiple wires taut across the cutting zone; and
   (e) displacing said workpiece relative to said multiple-wire bundle transversely to said straight-line wire-travel path to machine a contour in the workpiece.

2. A method of electroerosively machining an electrically conductive workpiece with a single elongate tool electrode in a cutting zone flushed with a machining fluid, the method comprising the steps of:
   (a) dispensing a plurality of continuous, electrically conductive, elementary electrode wires from respective wire supply sources to advance said multiple wires towards said cutting zone across the workpiece;
   (b) assembling said separate traveling continuous multiple elementary electrode wires in a wire-travel path to bring them together into a substantially mutually abutting relationship along a continuous length thereof across said cutting zone, thereby to form a unitary bundle of said multiple elementary electrode wires traversing the workpiece, said unitary bundle constituting said single elongate tool electrode;
   (c) electrically connecting one pole of an electroerosion power supply to said multiple traveling wires and the other pole thereof to said workpiece to pass a machining current between said unitary bundle and said workpiece across a machining gap, thereby to erosively remove material from the workpiece in said fluid-flushed cutting zone;
   (d) taking up said wires from said cutting zone for collection while holding the traveling multiple wires taut across the cutting zone;
   (e) displacing said workpiece relative to said wire bundle transversely to a longitudinal axis thereof to machine a contour in the workpiece.

3. The method defined in claim 1 or 2 wherein said plural, separate wires are advanced in the same direction towards and through said cutting zone.

4. The method defined in claim 3, further comprising the step of twisting said multiple elementary electrode wires to form said bundle which is twisted at least along a length thereof traveling across said cutting zone.

5. The method defined in claim 4 wherein said traveling multiple wires are intermittently twisted to form said bundle which advances continuously but is intermittently twisted.

6. The method defined in claim 3 wherein said multiple wires as they remain in said bundle are collected into a single collection site.

7. The method defined in claim 1 or claim 2, further comprising, step (b), shaping said multiple elementary electrode wires so as to provide said wire bundle with a predetermined cross-sectional contour adjacent to the wall of said workpiece across said machining gap.

8. The method defined in claim 7 wherein said multiple elementary electrode wires are shaped by arranging the multiple wires forming said bundle in a particular pattern such as to provide said predetermined contour.

9. The method defined in claim 8, further comprising changing the arrangement of said mulitple wires forming said bundle as a function of the direction of said transverse relative displacement between the workpiece and the multiple-wire bundle.

10. The method defined in claim 1 or claim 2 wherein said elementary electrode wires are dispensed from their respective supply sources located in one side of said workpiece and are taken up for collection in the other side of said workpiece.

11. The method defined in claim 1 or claim 2 wherein said elementary electrode wires have a thickness or thicknesses ranging between 0.05 and 0.5 mm.

12. The method defined in claim 1 or claim 2 wherein said elementary electrode wires have a thickness or thicknesses ranging between 0.1 and 0.5 mm.

13. The method defined in claim 1 or claim 2 wherein said elementary electrode wires are essentially circular in cross section.

14. The method defined in claim 1 or claim 2 wherein the number of said wires is 2 to 5.

15. An apparatus for electroerosively machining an electrically conductive workpiece with a single elongate tool electrode in a cutting zone flushed with a machining fluid, said apparatus comprising:

a plurality of wire supply sources for dispensing multiple elementary electrode wires respectively therefrom to advance then separately towards said cutting zone;

means disposed in a wire-travel path for assembling said multiple traveling wires to bring them together into a substantially mutually abutting relationship along a continuous length thereof across said cutting zone, thereby to form a unitary bundle of said multiple wires traversing the workpiece, said unitary bundle constituting said single elongate tool electrode;

an electroerosion power supply having one pole connectable to said multiple wires and the other pole connectable to said workpiece for passing a machining current between said bundle and said workpiece across a machining gap to electroerosively remove material from the workpiece in said fluid-flushed cutting zone;

means for taking up said multiple wires from said cutting zone;

tension means for holding said traveling multiple wires taut across said cutting zone; and machining feed means for displacing said workpiece relative to said multiple-wire bundle transversely to a longitudinal axis thereof to machine a contour in said workpiece.

16. The apparatus defined in claim 15, further comprising a pair of cutting electrode guides for defining therebetween a straight-line wire-travel path traversing said workpiece, said assembling means comprising a wire guide means disposed in an extension of said straight-line wire-travel path for bringing the multiple wires from the respective supply sources into said abutting relationship to form said bundle traveling said cutting zone.

17. The apparatus defined in claim 16, further comprising means for twisting said multiple wires to form said bundle which is twisted at least across said cutting zone.

18. The apparatus defined in claim 17 wherein said twisting means includes at least one rotary guide member constituting at least one of said cutting electrode guides and adapted to be reciprocated rotationally about an axis of said bundle.

19. The apparatus defined in claim 18, including two such rotary guide members constituting said cutting electrode guides and adapted to be rotatable in mutually opposite directions in each cycle of said rotational reciprocation.

20. The apparatus defined in claim 17 wherein said twisting means includes respective guide openings in said cutting electrode guides, equally shaped to allow said wires forming said bundle to be slidably passed therethrough but arranged with different orientations relative to one other.

21. The apparatus defined in claim 16 wherein said wire guide means comprises a pair of rollers arranged to be rotatable while pressing said multiple wires therebetween.

22. The apparatus defined in claim 16, further comprising wire drive means for advancing said multiple wires in the same direction through said cutting zone.

23. The apparatus defined in claim 15, further comprising means in said wire travel path for shaping said multiple wires to provide said bundle with a predetermined cross-sectional contour spaced from the wall of said workpiece across said machining gap.

24. The apparatus defined in claim 23 wherein said shaping means comprises adjustable means for allowing the arrangement of said multiple wires in a desired pattern such as to provide said predetermined contour of said bundle.

25. The apparatus defined in claim 24 wherein said adjustable means is associated with means for changing the arrangement of said multiple wires forming said bundle as a function of the direction of the relative transverse displacement between said workpiece and said bundle.

* * * * *